April 28, 1925.

P. W. JONES 1,535,781

EYEGLASS CONSTRUCTION

Filed March 28, 1922

Inventor
Percival W. Jones
By his Attorneys

Patented Apr. 28, 1925.

1,535,781

UNITED STATES PATENT OFFICE.

PERCIVAL W. JONES, OF PROVIDENCE, RHODE ISLAND, ASSIGNOR TO BAY STATE OPTICAL COMPANY, OF ATTLEBORO, MASSACHUSETTS, A CORPORATION OF MAINE.

EYEGLASS CONSTRUCTION.

Application filed March 28, 1922. Serial No. 547,408.

*To all whom it may concern:*

Be it known that I, PERCIVAL W. JONES, a citizen of the United States, and a resident of Providence, in the county of Providence and State of Rhode Island, have invented an Improvement in Eyeglass Constructions, of which the following is a specification.

This invention relates to eyeglass construction with particular reference to the mounting of swinging nose levers or finger pieces and their associated parts.

One of the objects thereof is to provide a strong and durable construction of the above nature which is capable of a high degree of efficiency in action. Another object is to provide a construction of the above nature which is inexpensive and simply made. Another object is to provide a construction of the above nature in which moving parts are protected from dirt and wear and are yet readily accessible for repair or replacement. Another object is to provide an eye-glass spring of strong and compact form and efficient in action. Other objects will be in part obvious or in part pointed out hereinafter.

The invention accordingly consists in the features of construction, combinations of elements and arrangements of parts as will be exemplified in the structure hereinafter described and the scope of the application of which will be indicated in the following claims.

In the accompanying drawing in which is shown one of the various possible embodiments of this invention, Figure 1 is a vertical, sectional elevation of a nose lever mounting device and the connecting parts of a pair of eyeglasses showing the construction in enlarged detail;

Similar reference characters refer to similar parts throughout the several views of the drawing.

Figure 2:
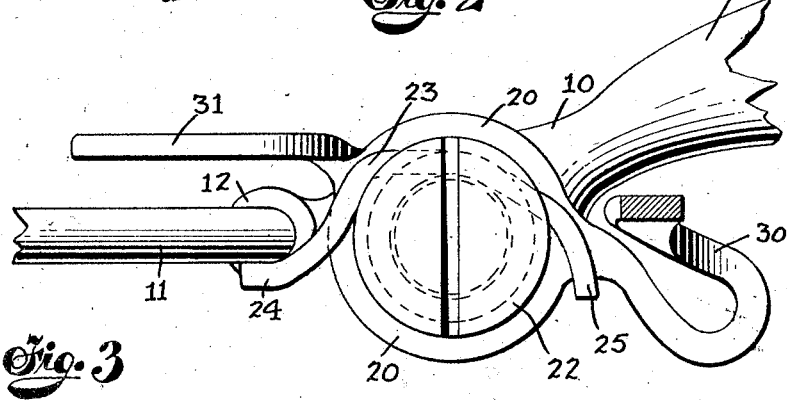
Figure 2 is a plan view of the device shown in Fig 1, looking down upon the same.

Referring now to the drawing in detail, there is shown at 10 an eyeglass frame member secured by a suitable clamping device as at 12 to a rim 11 of an eyeglass lens and formed on or secured to a bridge or nose piece 13. The construction on one side only of the bridge 13 is shown since the structure on both sides is substantially the same. As shown in Fig. 2, a swinging finger piece or guard arm 20 is mounted to swing upon frame member 10. Guard arm 20 is provided on its rear arm with any desired form of nose-engaging device 30 and upon its forward end with a finger grip 31 by which it may be swung in the usual manner.

Figure 1:
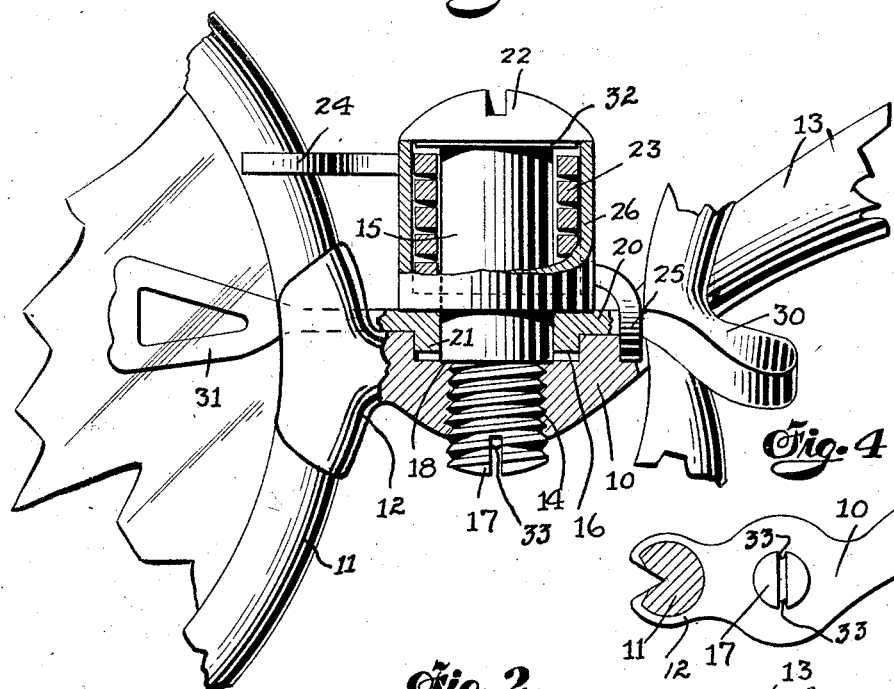
Figure 4:
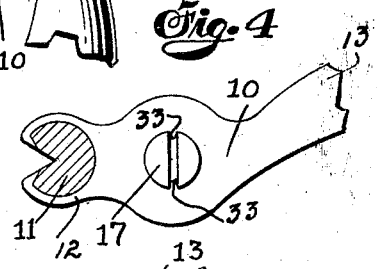
Figure 4 is a plan view from the bottom of Fig. 1, certain parts being omitted.

As shown more in detail in Fig. 1, frame 10 has preferably formed therein a threaded opening 14 into which a screw member 15 is adapted to be threaded and about the opening is preferably formed a recess 16. Guard arm 20 rests upon frame 10 and is preferably provided with an annular flange 21 about its opening through which screw 15 passes, flange 21 being adapted to mate with the recess 16 in frame 10. This interfitting construction of flange 21 of the guard arm and recess 16 of the frame serves not only to line up the openings in arm 20 and frame 10, but also tends to hold the two members in alignment and adds to the strength and security of the mounting. At the upper end of its threaded portion 17 screw 15 is preferably provided with a shoulder 18 which engages the surface of frame 10 and limits the movement of the screw thereinto.

From shoulder 18 to the head 22 the shank of screw 10 is of a substantially constant diameter. The threaded portion 17 of screw 15 is preferably of sufficient length to protrude through frame 10 and is slotted at its end into which slot a portion of member 10 is swaged as at 33 to a lock the screw in place.

A cup-shaped casing 26 provided with an opening in its base through which screw 15 passes rests upon guard arm 20, its upper edge registering with a bevel 32 on the under side of head 22 and its outer surface being flush with the periphery of head 22. Casing 26 is of such a length that when screw 15 is threaded tightly into frame 10 guard arm 20 and casing 26 will be held snugly between head 22 and frame 10 and yet guard arm 20 will be permitted entire freedom of movement in swinging upon frame 10.

Figure 3:
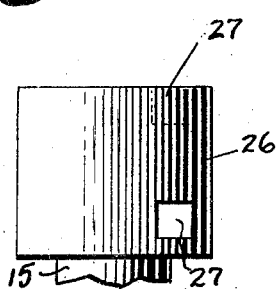
Figure 3 is a detached view of one of the parts shown in Fig. 1.

Coiled upon the shank of screw 15 inside of casing 26 is a spiral spring 23 formed preferably of a member having square or rectangular cross section. The ends of spring 23 pass through openings 27 in casing 26 (see Fig. 3) and engage the eyeglass frame, as at 24, and the guard arm 20, as at 25, to tend to swing the nose lever inwardly to grip the nose. A spring 23 being of squared cross section employs to best advantage the space allowed for it in the rectangular space between screw 15 and casing 26 and thus provides a spring of maximum cross section and strength relative to the space which it occupies. The coils are preferably spaced from each other and from screw 15 and casing 26 just enough to permit of free expansion and contraction of the spring as guard arm 20 is swung. Thus spring 23 is substantially encased between screw 15 and casing 26 and is thereby protected from dirt and wear resulting from continual handling of the eyeglass. In addition, by the spring being covered in this manner the mounting as a whole presents a neat and attractive appearance. The parts are easily assembled and readily removable for replacement or repair.

It will thus be seen that there is herein provided an apparatus which embodies the various features of this invention, which apparatus in its action attains the various objects of the invention and is well adapted to meet the requirements of practical use.

As many embodiments might be made of the above invention and as many changes might be made in the embodiment above set forth, it is to be understood that all matter hereinbefore set forth or shown in the accompanying drawing is to be interpreted as illustrative and not in a limiting sense.

I claim as my invention:

1. In eyeglass construction, in combination, an eyeglass frame, a nose lever adapted to swing thereon, a screw member passing through an opening in said nose lever and engaging said frame and having a head at its end remote from said frame, said head being beveled under its outer edge, a spring coiled upon said screw member and connected to swing said lever, and a casing substantially covering said spring, one end of said casing resting upon said nose lever and its other end registering with said bevel on said screw head.

2. In eyeglass construction, in combination, an eyeglass frame, a swinging nose lever mounted thereon and provided with an opening therein, a screw member passing through said opening and engaging said frame and provided with a shoulder engaging the surface of said frame to limit its movement thereinto, a spiral spring of rectangular cross section coiled about said screw below its head, said spring being connected to swing said nose lever, and a cup-shaped member having an opening in its base through which said screw member passes held between said nose lever and the head of said screw, exterior of said spring.

3. In eyeglass construction, in combination, an eyeglass frame having a recess therein, a swinging nose lever mounted on said frame and having an opening and an annular flange about the same registering with said recess, a screw member passing through said opening in said nose lever and engaging said frame and provided with a shoulder adapted to engage the surface of said frame and limit its movement thereinto, a cup-shaped member having an opening in its base through which said screw member passes resting between said nose lever and the head of said screw, its outer surface being flush with the periphery of the head, and a member of rectangular cross section coiled upon said screw member within said cup-shaped member and connected to serve as a spring to swing said nose lever.

4. In eyeglass construction, in combination, an eyeglass frame, an upright member mounted thereon, a nose lever pivoted upon said upright member and mounted to swing on said frame, a spring coiled about said upright member and connected to swing said lever, and a cup-shaped member resting upon said nose lever having an opening in its base through which said upright member passes and substantially encasing said spring.

5. In eyeglass construction, in combination, an eyeglass frame, an upright screw threaded thereinto having a head at its upper end and a shoulder limiting its movement into said frame, a nose lever resting on said frame and mounted to swing about said screw as a pivot, a spring coiled about said screw between said head and said nose lever and connected to swing said nose lever, and a casing beneath said head resting upon said nose lever exterior of and substantially encasing said spring, the combined height of said nose lever and said casing permitting them to rest freely between said frame and said head when said screw is threaded into place with said shoulder against said frame.

In testimony whereof, I have signed my name to this specification this 24th day of March, 1922.

PERCIVAL W. JONES.